United States Patent
Cimpean et al.

(10) Patent No.: US 10,525,908 B2
(45) Date of Patent: Jan. 7, 2020

(54) MOTOR VEHICLE LATCHING SYSTEM WITH CABLE DUCT

(71) Applicant: Kiekert AG, Heiligenhaus (DE)

(72) Inventors: Octavian Cimpean, Rochester Hills, MI (US); Michael Uhrin, Oak Park, MI (US); John Kachnowski, Wixom, MI (US); Brad Edgar, Howell, MI (US)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 15/982,088

(22) Filed: May 17, 2018

(65) Prior Publication Data

US 2019/0351848 A1  Nov. 21, 2019

(51) Int. Cl.
*H02G 3/22* (2006.01)
*B60R 16/02* (2006.01)
*H02G 3/04* (2006.01)

(52) U.S. Cl.
CPC ....... *B60R 16/0222* (2013.01); *H02G 3/0418* (2013.01)

(58) Field of Classification Search
CPC .. H02G 3/22; H02G 3/24; H02G 3/26; H02G 3/30; H02G 3/36; H02G 15/007; H02G 15/04; H02G 3/083; H02G 3/0418; B60R 16/0222; B60R 16/0215
USPC ..... 174/650, 135, 68.3, 72 A, 152 G, 153 G, 174/137 R, 68.1, 88 R; 248/68.1, 49
See application file for complete search history.

(56) References Cited

U.S. PATENT DOCUMENTS

| | | | | |
|---|---|---|---|---|
| 4,959,509 A * | 9/1990 | Takeuchi | ............... | H02G 3/083 174/153 G |
| 5,170,017 A * | 12/1992 | Stanevich | ............ | H02G 15/013 174/153 G |
| 5,856,635 A * | 1/1999 | Fujisawa | .................. | H02G 3/22 174/153 G |
| 6,525,269 B2 * | 2/2003 | Sato | .......... | H02G 3/22 174/153 G |
| 6,737,583 B2 * | 5/2004 | Saeki | .................. | B60R 16/0222 174/152 G |
| 7,005,579 B2 * | 2/2006 | Beele | ....................... | H02G 3/22 174/153 G |
| 7,053,305 B2 * | 5/2006 | Takase | ................ | B60R 16/0215 174/135 |
| 7,244,894 B1 * | 7/2007 | Lipp | ................... | B60R 16/0222 174/152 G |
| 7,388,156 B2 * | 6/2008 | Knagge | .................... | H02G 3/22 174/153 G |
| 7,434,814 B2 * | 10/2008 | Kumakura | ............... | F16L 5/10 174/152 G |

(Continued)

*Primary Examiner* — Angel R Estrada
(74) *Attorney, Agent, or Firm* — Renner, Otto, Boisselle & Sklar, LLP

(57) ABSTRACT

The invention relates to a motor vehicle system, in particular a motor vehicle latching system encompassing a locking mechanism with a catch and a pawl, where the motor vehicle system encompasses a cable duct 1 for the conducting of a cable 4, 5 through a sheet metal aperture, whereby the cable duct 1 is formed of a single component and has a first exit aperture 2 for a first cable 4 and a second exit aperture 3 for a second cable 5, which are designed in such a way that the first cable 4 and the second cable 5 cannot come into contact with one another when exiting the cable duct 1. Undesired noise formation can thus be counteracted in an improved manner.

20 Claims, 3 Drawing Sheets

(56) References Cited

U.S. PATENT DOCUMENTS

Figure 5:
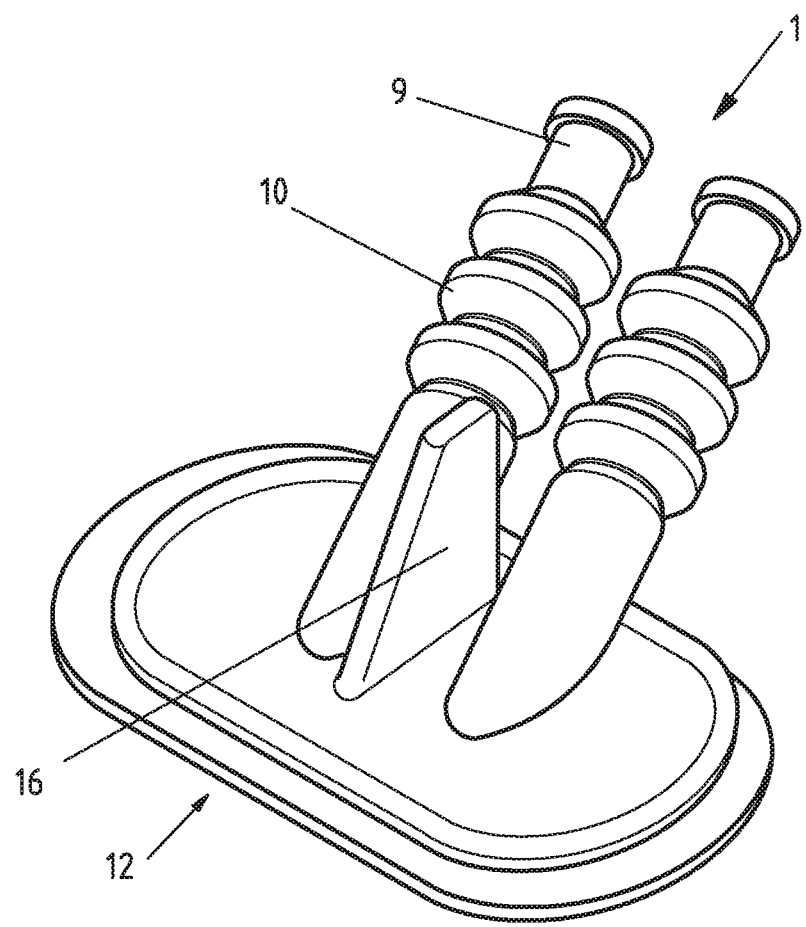

| | | | | |
|---|---|---|---|---|
| 7,767,911 B2* | 8/2010 | Kawasaki | ........... | B60R 16/0222 174/153 G |
| 7,943,854 B1* | 5/2011 | Lipp | .................... | H02G 3/0468 174/153 G |
| 7,952,032 B2* | 5/2011 | Suzuki | ................ | B60R 16/0222 174/153 G |
| 8,108,968 B2* | 2/2012 | Pietryga | ............... | H02G 3/0468 174/153 G |
| 8,563,878 B2* | 10/2013 | Suzuki | .................... | H02G 3/22 174/650 |
| 8,692,122 B2* | 4/2014 | Suzuki | .................... | H02G 3/22 174/152 G |
| 8,704,099 B2* | 4/2014 | Agusa | ................ | B60R 16/0222 174/153 G |

* cited by examiner

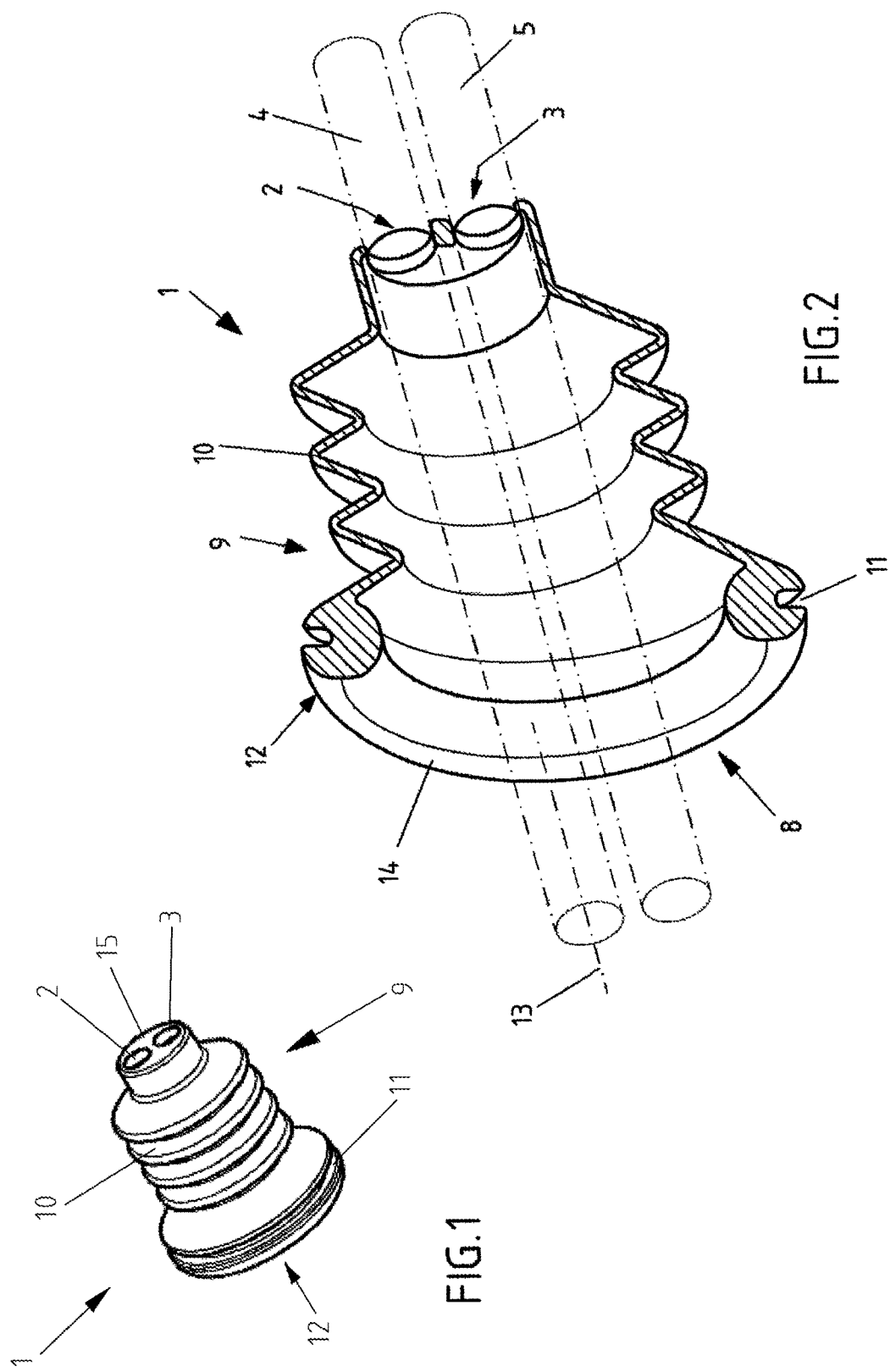

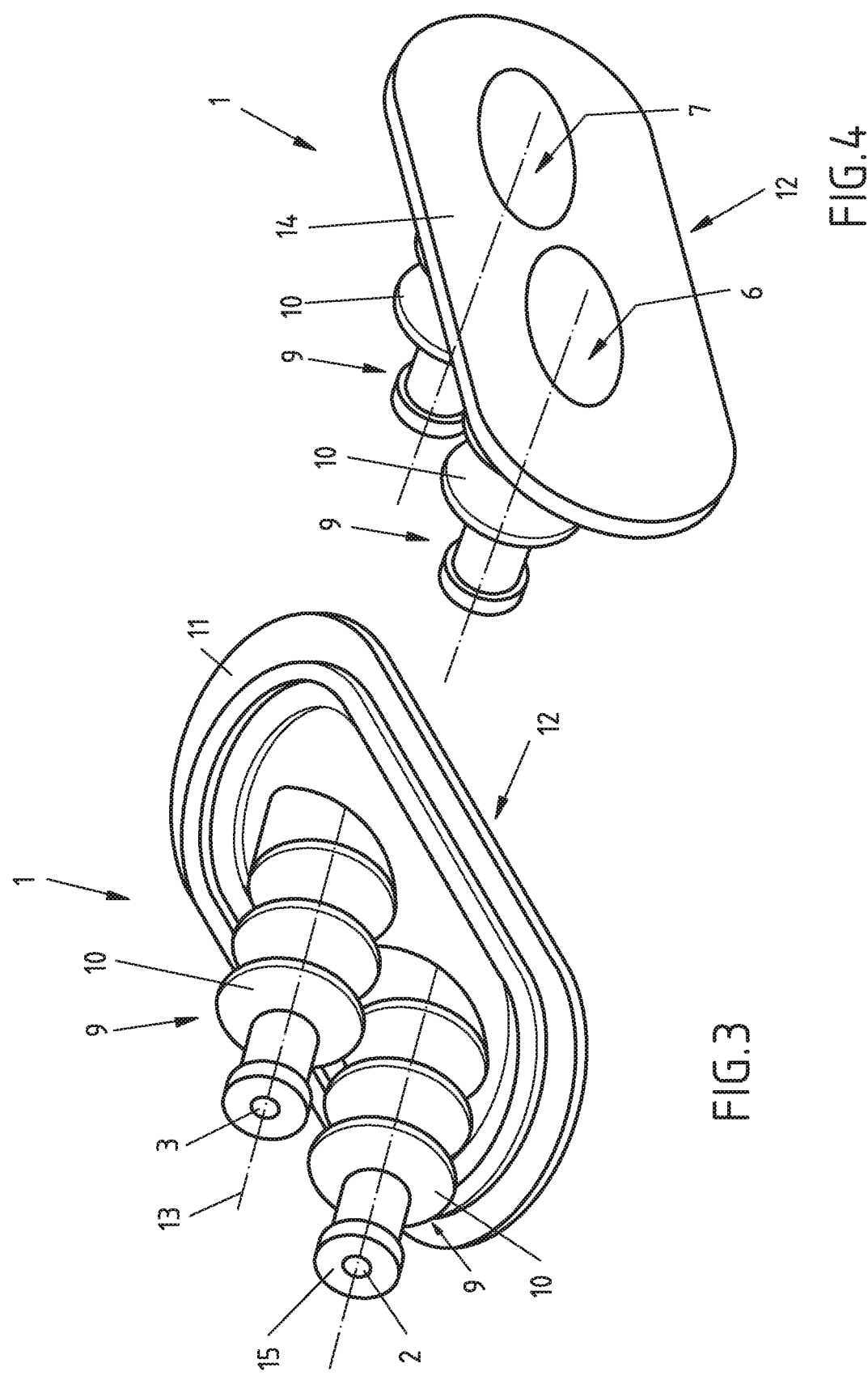

MOTOR VEHICLE LATCHING SYSTEM WITH CABLE DUCT

The invention relates to a motor vehicle system, especially a motor vehicle latching system encompassing a locking mechanism with a catch and a pawl, where the motor vehicle system encompasses a cable duct to conduct a cable through a sheet metal aperture.

A locking mechanism provided for latching of a door or flap comprises at least one catch and at least one pawl. The catch can be pivoted from an open position to a closed position with the aid of a locking bolt of a door or a flap. The pawl ratchets the catch in the closed position. The locking bolt can then no longer leave the locking mechanism as the catch can then no longer be pivoted back into its open position. For opening, the pawl must initially be moved out of its ratchet position, i.e. lifted from the catch. The catch can subsequently be pivoted back into its open position. The locking bolt can then leave the locking mechanism and a pertaining door or flap can be opened.

There can be two ratchet positions, namely a so-called pre-ratchet position and a main ratchet position. If a catch is ratcheted in the pre-ratchet position, the pertaining door or flap is not yet completely latched. The catch can then be further rotated in the direction of the main ratchet position in order to be ratcheted in the main ratchet position. A pertaining door or flap is then completely closed. The catch can be rotated from the pre-ratchet position to the main ratchet position with the aid of an electrical drive, for example an electromotor.

Unratcheting or triggering of the locking mechanism is performed with the aid of an operating device. If a pertaining operating device is operated, an associated locking mechanism of a door or flap is unratcheted, i.e. opened.

The pertaining door or flap can then be opened. Unratcheting can also occur with the aid of an electrical drive, an electromotor for example.

A motor vehicle latching system can also be bolted. In the bolted state, a locking mechanism can no longer be opened externally by operation of an external operating element, such as an external door handle. In order to provide improved protection from theft, bolting also takes place in such a way that opening can also no longer take place by operating an internal operating element. In the engaged state, a child lock prevents a rear door of a motor vehicle being able to be opened from inside. The bolting, unbolting, engagement or disengagement of an anti-theft device or a child lock can also be performed with the aid of an electrical drive, especially an electromotor.

An electrical drive of a motor vehicle system, for example of a motor vehicle latching system, is supplied with energy via a cable. The motor vehicle system can also be controlled and regulated via a cable for the transmission of analogue or digital data. Apertures are inserted into walls for cable installation which would otherwise constitute an obstacle for the cable paths provided. In particular in the case of metal housing walls, there is a risk of damage to the cable due to sharp aperture edges on such apertures. Therefore, usually only a single cable is conducted through each aperture and a cable duct is also used to protect the cable.

The aforementioned features known from the state of the art can be combined individually or in any combination with one of the objects according to the invention described hereafter.

It is a task of the invention to provide a further developed motor vehicle system. A motor vehicle system according to claim 1 solves the task. Advantageous embodiments result from the sub-claims.

The task is solved by a motor vehicle system e encompassing a cable duct for conducting a cable through a sheet metal aperture. In one embodiment, the latching system encompasses a locking mechanism with a catch and a pawl.

On the motor vehicle system according to the invention, to solve the task the cable duct is formed of a single component and has a first exit aperture for a first cable and a second exit aperture for a second cable which are designed in such a way that the first cable and the second cable cannot come into contact with one another when exiting the cable duct.

Formed of a single component means that the cable duct is a cohesive component. In principle, a cohesive component can demonstrate several firmly connected partial components. A firm connection does not permit scheduled relative movement at the connection point, but generally produces a rigid or stiff connection. Exit aperture means an external aperture through which a cable passes from the impact area or contact area. The cable can be any cable used in the motor vehicle, for example be a supply cable or a signal transmission cable.

The first and second exit aperture and the first and second cable are two separate exit apertures or two separate cables. In particular, there is no intersection or intersect points of the first and second exit aperture. The first and/or second exit aperture are preferably closed. The first cable is therefore completely encircled, i.e. surrounded by the first exit aperture, and the second cable is completely, i.e. 360°, encircled by the second exit aperture.

"On exiting the cable duct" means on the external surface of the cable duct in the exit direction. In other words, the first cable and the second cable cannot come into contact with one another at the external surface of the cable duct in the exit direction. After exiting the cable duct, i.e. at a certain distance from the external surface of the cable duct, the first and second cable can come into contact with one another on the contrary because the cables are generally flexible and the further course of the cables depends on the cable path provided.

The invention is based on the insight that the interface of a cable duct can be the source of a troublesome noise evolution with an edge of a sheet metal aperture and closely compressed cables. A rattling or clattering noise can occur in particular during operation of the motor vehicle and the associated vibrations.

By means of the provision of a single-component cable duct with a first exit aperture for a first cable and a second exit aperture for a second cable which are designed in such a way that the first cable and the second cable cannot come into contact with one another when exiting the cable duct, it was ascertained that the troublesome noise evolution in operation can be reduced.

In one embodiment, the cable duct is formed of a single component. The single-component cable duct therefore has no connected partial component, but is manufactured from a single piece of material. The single-component embodiment of the cable duct already reduces the noise evolution. In contrast, a particularly significant noise reduction can be attained by executing the single-component cable duct as a single-component cable duct.

In one embodiment, the cable duct was manufactured by injection molding. The cable duct can therefore be manufactured from a noise-absorbent material at low cost and in large quantities.

In one embodiment, the cable duct encompasses rubber or an elastomer or is manufactured from this. This not only enables better noise prevention, but also a great sealing effect. The cable can also be protected especially effectively as rubber or the elastomer adapt to the movement of the cable and can elastically accommodate a sharp edge of a sheet metal aperture, instead of being cut in an accelerated manner, for example on a rigid thermoset. This also enables simple molding of a bellows. Rubber or elastomer is preferably able to be elastically deformed by at least 5% in length or in a lengthwise direction before subsequently returning to its original form again.

In one embodiment, the cable duct has exactly two exit apertures. By providing exactly two exit apertures for exactly one cable in each instance, i.e. exactly one cable duct for exactly two cables, noise evolution can be counteracted especially effectively. Because compared to the known cable ducts for only a single cable in each instance on the one hand the number of interfaces between the cable duct and the sheet metal are reduced and on the other hand noise evolution within the cable duct is prevented or at least adequately reduced by the conducted cables.

In one embodiment, the first exit aperture and the second exit aperture are oriented in parallel and/or the first cable and the second cable are conducted in parallel in the area of the first exit aperture and the second exit aperture. This thus prevents in an especially simple and effective manner the first cable and the second cable from coming into contact with one another when exiting the cable duct. If the first cable and the second cable are conducted in parallel in the area of the first exit aperture and the second exit aperture, the first and second exit aperture are thus preferably linear or tubular in the exit direction.

In one embodiment, the cable duct encompasses a cover to cover a cable from an entry aperture to the first exit aperture and/or the second exit aperture. In principle, a cover is a closed sheathing. An entry aperture means an entry aperture for a cable. In particular, the entry aperture is arranged on the opposite side or external side of the cable duct compared to the first and/or second exit aperture. Consequently, a cable can go directly and/or in a linear manner from the entry aperture to the exit aperture. In one design, the entry aperture and the exit aperture are coaxial. In an alternative or complementary design, the first exit aperture and/or the second exit aperture are covered by the entry aperture, i.e. surrounded in the lengthwise direction of the cover or normal direction of the entry aperture. By providing a cover to cover a cable from an entry aperture to the first exit aperture and/or the second exit aperture, especially effective noise protection can be facilitated. In addition, especially effective sealing can take place.

In one embodiment, the cover is lengthwise. The cable duct can thus be adapted especially flexibly to movements of the cable, absorb vibrations of the cable and maintain a cable in a planned alignment for reduced noise formation by contact with adjacent components. Lengthwise direction means the extension in the exit direction, i.e. the direction of a perpendicular to the exit aperture. The lengthwise extension of the cover extends in the lengthwise direction in particular. The length of the cover is also measured in the lengthwise direction.

In particular, the cover is at least three times as long as the diameter of the entry aperture and/or a maximum of ten times or a maximum of fifteen times as long. A longer cover would be susceptible to crack formation and could also lead to noise formation itself due to rubbing against adjacent covers.

In one embodiment, two separate covers are provided in each instance for the first cable and the second cable. Especially reliable prevention of noise formation within the cable duct can thus be enabled by cables rubbing together. In particular, a first cover extends from a first entry aperture to the first exit aperture while a second cover extends from a second entry aperture—separate from the first entry aperture and/or not overlapping—to the second exit aperture.

In one embodiment, a common cover is provided to cover both cables. This saves manufacturing costs compared to two covers, especially in the case of provision of bellows. This common cover extends in particular from a common entry aperture for both cables—preferably on the opposite external side to the first and/or second exit aperture—to the first and second exit aperture which are also surrounded radially by the common cover. Two cables can thus enter through the common entry aperture into the cable duct, protected by the common cover—without a separation between—to the exit apertures and finally exit separately out of the cable duct through the exit apertures.

Alternatively or additionally, this common cover can be an additional cover which covers the two separate covers described above in order to reduce relative movement between the two separate covers or to provide better protection.

Generally, the length of the exit apertures is limited to the material thickness of the external wall of the cable duct in the exit direction. The cavity formed by the cover is adjacent to the exit apertures. The same applies to the entry aperture which is also adjacent to the cavity formed by the cover from the opposite side. In particular, the entry aperture forms a cavity formed by the cover and an exit aperture a through hole for a cable.

In one embodiment, the cover encompasses bellows. Bellows means the bellow-type or bellow-shaped section of the cover in which the cover has a wavelike girthed area in the lengthwise direction. In other words, there is a ring-shaped narrowing in the bellow-shaped or bellow-type section which forms a wave trough, followed by a ring-shaped widening which forms a wave crest. A cover with bellows enables especially flexible adaptation of the cable duct to cable movements and vibrations which not only contributes at least to a certain extent to noise reduction, but also leads to improved sealing and simpler cable installation.

In particular, the bellows has at least three and/or a maximum of six wave crests. The bellows preferably has at least two and/or a maximum of four wave crests. All wave troughs and/or wave crests preferably have the same diameter. This enables a compact design.

In one embodiment, the cable duct has a connection device for the closed connection of the cable duct with the sheet metal aperture. A closed connection means that the cable duct lies adjacent circumferentially over 360° closed to the sheet metal aperture. A connection device for the closed connection of the cable duct to the sheet metal aperture can effectively counteract noise evolution. In addition, especially effective sealing can take place.

In one embodiment, the cable duct encompasses a basic component in the peripheral area of which the connection device is arranged and/or which has the entry aperture. A basic component in the peripheral area of which the connection device is arranged can provide especially effective sealing. In addition, two separate covers can be provided especially simply, flexibly and still as single components. A basic component incorporating the entry aperture enables two cables to be separated from one another especially simply and effectively in order to prevent noise formation within the cable duct.

In one embodiment, the first exit aperture and the second exit aperture together demonstrate a surface transversely to the lengthwise direction which is at least three times and/or a maximum of ten times smaller than the surface of the entry aperture or entry apertures or the external surface of the basic component. This enables a cable to obtain freedom of movement for an especially easy conduction and cable installation on entry into the cable duct.

In particular, compared to the entry apertures the basic component provides an external surface which is at least six times and/or a maximum of ten times as large. Especially simple cable installation can thus be ensured due to the large cable distances facilitated.

In one embodiment, the cover is oriented under an angle of at least 30° and/or at most 60° from the external surface of the basic component. The external surface of the basic component generally means the surface of the cable duct on the underside, whereby the underside lies on the opposite side to the exit apertures. The exit apertures in turn generally lead into the upper side or its external surface. This angular arrangement of the cover can attenuate or reduce vibrations between the cable duct and the sheet metal.

In one embodiment, two covers running parallel to one another are oriented under an angle of at least 30° and/or at most 60° from the external surface of the basic component.

In one embodiment, an integrally connected, wing-shaped bridge is arranged between the two parallel covers on the basic component. The wing-shaped bridge primarily stabilizes the basic component and simultaneously prevents the covers entering into contact with the exit areas in the case of extreme stresses of the motor vehicle system in drive operation.

Exemplary embodiments of the invention are explained in further detail hereafter on basis of the following figures. Features of the exemplary embodiments can be individually or severally combined with the stressed object.

The following are shown:

FIG. 1: Diagrammatic isometric illustration of a cable duct with a common entry aperture for two cables;

FIG. 2: Diagrammatic sectional view of the cable duct illustrated in FIG. 1,

FIG. 3: Diagrammatic isometric illustration from above of a cable duct with separate entry apertures for one cable in each instance;

FIG. 4: Diagrammatic isometric illustration from below on the cable duct in FIG. 3.

FIG. 5: Diagrammatic isometric illustration from above of a cable duct with additional bridge FIGS. 1 and 2 show a cable duct 1 of a motor vehicle system. The motor vehicle system in this exemplary embodiment is a motor vehicle latching system encompassing a non-illustrated locking mechanism with a catch and a pawl which conducts a first cable 4 and a second cable 5 (depicted by dotted lines in FIG. 2) through a non-illustrated sheet metal aperture. The cable duct 1 is single-component, and is in particular manufactured in a single-piece manner from an elastic, thermoplastic injection-molded plastic.

A ring-shaped basic component 12 forms an external surface 14 on the underside of the cable duct 1. On the lateral side of the basic component 12 a circumferential groove is provided as a connection device 11 for adjacent, form-fitting connection with the sheet metal aperture. Consequently, sealing from moisture is attained. The inside of the basic component 12 constitutes the common entry aperture 8 for both cables 4, 5. The ring-shaped basic component 12 has a greater thickness, i.e. ring thickness in a radial direction than the thickness of the cover 9 adjacent in a lengthwise direction to the basic component 12.

The cover 9 has a bellows 10 in the form of a bellows-shaped section which accounts for especially 70% of the length of the cover 9. The wave crests have a smaller diameter than the basic component 12. The wave troughs have a smaller diameter than the entry aperture 8.

On the upper side, the cover has a hat-shaped section with a constant cylinder diameter which is less than the diameter of the entry aperture 8 and/or is larger than the total of the diameters of the exit apertures 2, 3. The upper side of the hat-shaped section is the external surface 15 in which the first exit aperture 2 and the second exit aperture 3 lead to. The hat-shaped section has a length in the lengthwise direction 13 which approximately corresponds to the lengthwise extension of the basic component 12. This lengthwise extension is greater than the diameter of one of the exit apertures 2, 3 and/or less than double the diameter of one of the exit apertures 2, 3.

The exit apertures 2, 3 extend in a lengthwise direction 13 by means of an external wall which is at least twice as thick as the thickness of the cover 9. The exit apertures 2, 3 have the same diameter, are oriented parallel to one another and/or are arranged adjacent to one another on the external surface 15. The entire cable duct is therefore mirror symmetrically illustrated in a lengthwise cut between the exit apertures 2, 3 or centrally through both exit apertures as illustrated in FIG. 2.

In the ready-for-operation state, the cables 4, 5 on the internal girthed area of the exit apertures 2, 3 lie closely or two-dimensionally adjacent, preferably subject to a transition fit or a press fit. Reliable conduction and stable holding of the cables in the cable duct 1 can thus be ensured.

FIGS. 3, 4 and 5 show another cable duct 1 of a motor vehicle system, in particular encompassing a non-illustrated locking mechanism with a catch and a pawl which conducts a first cable 4 and a second cable 5 (not illustrated) through a non-illustrated sheet metal aperture. The cable duct 1 is formed of a single component and is preferably made of injection-molded plastic.

On the underside, the sheet metal aperture is completely filled out by a flat basic component 12 with the exception of entry apertures 6, 7. On the upper side of the radial edge of the basic component 12 a stepped recess is provided as a connection device 11. A transition fit or a press fit between the connection device 11 and the sheet metal aperture enables closed, dense and mechanically firm connection. The connection can thus be facilitated by an internal area of the basic component 12 being sunk as shown in FIG. 3 to enable the peripheral area to be elastically deformed with particular ease in order to be inserted into the sheet metal aperture.

Alternatively or additionally, the slant on the radial edge on the underside of the edge can be used as the connection device 11 which is then pressed like a cork into a bottle opening until a closed, tight and mechanically firm connection is attained.

Two covers 9 extend out of the basic component 12 in a lengthwise direction 13 which include an angle between 30° and 60° to the external surface 14 of the basic component 12. A first cover 9 extends in a lengthwise direction 13 from the first entry aperture 6 to the first exit aperture 2. A second cover 9 extends in a lengthwise direction 13 from the second entry aperture 7 to the second exit aperture 3. In particular, both covers 9 run parallel to one another.

In one embodiment (FIG. 3), the cover 9 or covers 9 are angled or inclined in a lateral direction which corresponds to the direction in which the external surface 14 of the basic component 12 has its greatest expansion. This counteracts noise formation especially effectively.

In one embodiment (FIG. 5), the covers 9 are angled or inclined in a lateral direction which corresponds to the direction in which the external surface 14 of the basic component 12 has its smallest expansion. This counteracts noise formation especially effectively.

In this embodiment (FIG. 5) a wing-shaped bridge 16 is additionally arranged on the basic component 12 vertically between the extending covers 9. The bridge 16 is preferably executed in a trapezoid shape with a width which narrows as it goes upwards and is executed as a single component with the basic component 12 made of elastic, thermoplastic plastic by means of injection molding. The primary purpose of the bridge 16 is to stabilize the basic component 12 on the exit points of the covers 9. Simultaneously, with extreme stresses of the motor vehicle latching system during driving operation this arrangement simultaneously prevents touching of the covers 9 in the exit area from the basic component 12, whereby noise formation can be counteracted thus further.

The first and second cover 9 respectively have a bellows 10 which have the characteristics as described in conjunction with the exemplary embodiment in FIGS. 1 and 2. The respective cover 9 is also adjacent to a hat-shaped section here which also has the characteristics as described in conjunction with the exemplary embodiment in FIGS. 1 and 2.

In addition, the hat-shaped section has a flange-type recess on the upper side which leads to an enlarged external surface 15. This recess has approximately the external wall thickness or is formed by a radially stretching extension of the external wall on the upper side. This recess is capable of holding surrounding elements at a distance from the exiting cables in an improved manner.

The exemplary embodiments shown furthermore enable reduction of the number of components and a reduced number of required sheet metal apertures because two cables can now be conducted through an aperture while the cable protective effect from damage is increased at the same time and the cables can be installed especially quickly and simply with the aid of the cable duct shown.

In particular, the motor vehicle latching system has a locking mechanism encompassing a catch and a pawl. In principle, the purpose of a locking mechanism is to latch a door or flap.

The catch can be pivoted from an open position to a closed position with the aid of a locking bolt of a door or a flap. The pawl ratchets the catch in the closed position. The locking bolt can then no longer leave the locking mechanism as the catch can then no longer be pivoted back into its open position. For opening, the pawl must initially be moved out of its ratchet position, i.e. lifted from the catch.

The catch can subsequently be pivoted back into its open position. The locking bolt can then leave the locking mechanism and a pertaining door or flap can be opened.

There can be two ratchet positions, namely a so-called pre-ratchet position and a main ratchet position. If a catch is ratcheted in the pre-ratchet position, the pertaining door or flap is not yet completely closed. The catch can then be further rotated in the direction of the main ratchet position in order to be ratcheted in the main ratchet position. A pertaining door or flap is then completely closed. The catch can be rotated from the pre-ratchet position to the main ratchet position with the aid of an electrical drive, for example an electromotor.

Unratcheting or triggering of the locking mechanism is performed with the aid of an operating device. If a pertaining operating device is operated, an associated locking mechanism of a door or flap is unratcheted, i.e. opened.

The pertaining door or flap can then be opened. Unratcheting can also occur with the aid of an electrical drive, an electromotor for example.

A motor vehicle latching system can also be bolted. In the bolted state, a locking mechanism can no longer be opened externally by operation of an external operating element, such as an external door handle.

In order to provide improved protection from theft, bolting also takes place in such a way that opening can also no longer take place by operating an internal operating element. In the engaged state, a child lock also prevents a rear door of a motor vehicle being able to be opened from inside. The bolting, unbolting, engagement or disengagement of an anti-theft device or a child lock can also be performed with the aid of an electrical drive, especially an electromotor.

An electrical drive of a motor vehicle latching system is supplied with energy via a cable. The motor vehicle latching system is also controlled and regulated via a cable for the transmission of analogue or digital data.

The invention claimed is:

1. A motor vehicle system comprising a cable duct for conducting cables through a sheet metal aperture, wherein the cable duct is formed of a single component and has a first exit aperture and a first entry aperture for a first cable and a second exit aperture and a second exit aperture for a separate second cable, the first and second exit apertures being configured to prevent the first cable and the second cable from coming into contact with one another when exiting the cable duct, wherein the cable duct includes a first cover having a first set of bellows for coverage of the first cable from the first entry aperture to the first exit aperture and a second cover having a second set of bellows for coverage of the second cable from the second entry aperture to the second exit aperture.

2. The motor vehicle system of claim 1, wherein the cable duct is an injection molded part.

3. The motor vehicle system of claim 1, wherein the cable duct encompasses rubber or elastomer.

4. The motor vehicle system of claim 1, wherein the cable duct has exactly two exit apertures.

5. The motor vehicle system of claim 4, wherein the first exit aperture and the second exit aperture are oriented in parallel and/or the first cable and the second cable are conducted in parallel in the area of the first exit aperture and the second exit aperture.

6. The motor vehicle system of claim 1, wherein the at least one cover is lengthwise.

7. The motor vehicle system of claim 1, further comprising a connection device of the cable duct for the closed connection of the cable duct with the sheet metal aperture.

8. The motor vehicle system of claim 1, further comprising a basic component of the cable duct, in a peripheral area of which the connection device is arranged and/or which has the entry aperture.

9. The motor vehicle system of claim 8, wherein the first exit aperture and the second exit aperture together have a surface transverse to a lengthwise direction which is at least three times and at most ten times smaller than the surface of the entry aperture or entry apertures or the external surface of the basic component.

10. The motor vehicle system of claim 8, wherein the first cover and the second cover run parallel to one another and are oriented under an angle of at least 30° and/or at most 60° to the external surface of the basic component.

11. The motor vehicle system of claim 10, wherein an integrally connected, wing-shaped bridge is arranged between the covers on the basic component.

12. The motor vehicle system of claim 1, wherein the first cover and the second cover are identical in shape and size.

13. The motor vehicle system of claim 1, wherein the first exit aperture and the second exit aperture have a same diameter.

14. The motor vehicle system of claim 13, wherein the first entry aperture and the second entry aperture have a same diameter.

15. A motor vehicle system comprising a cable duct for conducting cables through a sheet metal aperture, wherein the cable duct is formed of a single component and has a first exit aperture for a first cable and a second exit aperture for a second cable, the first and second exit apertures being configured to prevent the first cable and the second cable from coming into contact with one another when exiting the cable duct, wherein the cable duct has a common entry aperture that is configured to receive both the first cable and the second cable, wherein the cable duct includes a single common cover that is configured to cover both cables from the common entry aperture to the first exit aperture and the second exit aperture, and wherein the common cover has a single set of bellows that surrounds both the first cable and the second cable from the common entry aperture to the first exit aperture and the second exit aperture when the first cable and the second cable are inserted in the cable duct.

16. The motor vehicle system of claim 15, wherein the common cover forms a cavity that defines the common entry aperture.

17. The motor vehicle system of claim 15, wherein the cable duct is formed to be mirror-symmetrical along a longitudinal axis of the cable duct.

18. The motor vehicle system of claim 15 further comprising a connection device of the cable duct for the closed connection of the cable duct with the sheet metal aperture.

19. The motor vehicle system of claim 15 further comprising a basic component of the cable duct, in a peripheral area of which the connection device is arranged and/or which has the common entry aperture.

20. The motor vehicle system of claim 19, wherein the single common cover is oriented under an angle of at least 30° and/or at most 60° to the external surface of the basic component.

* * * * *